Patented May 20, 1941

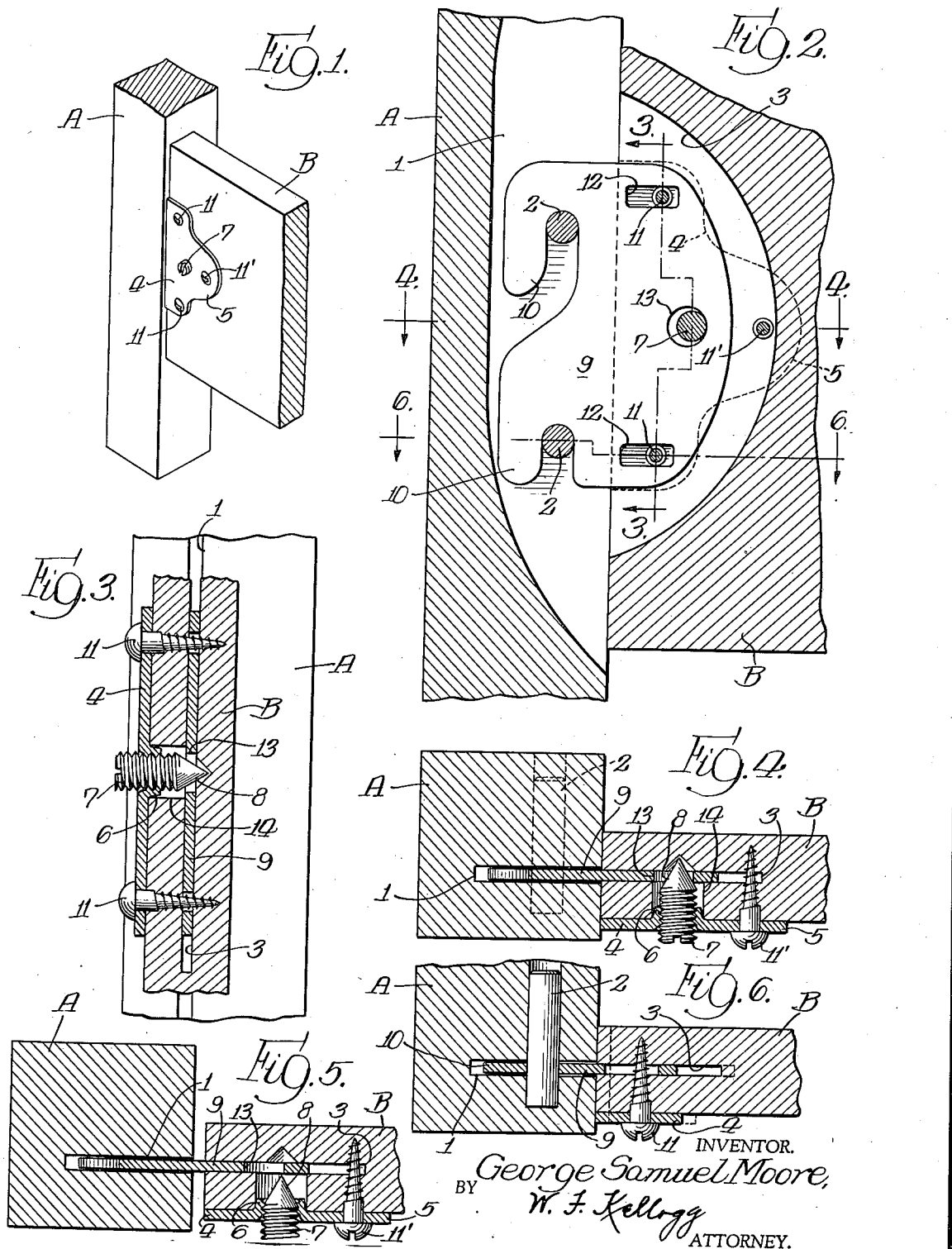

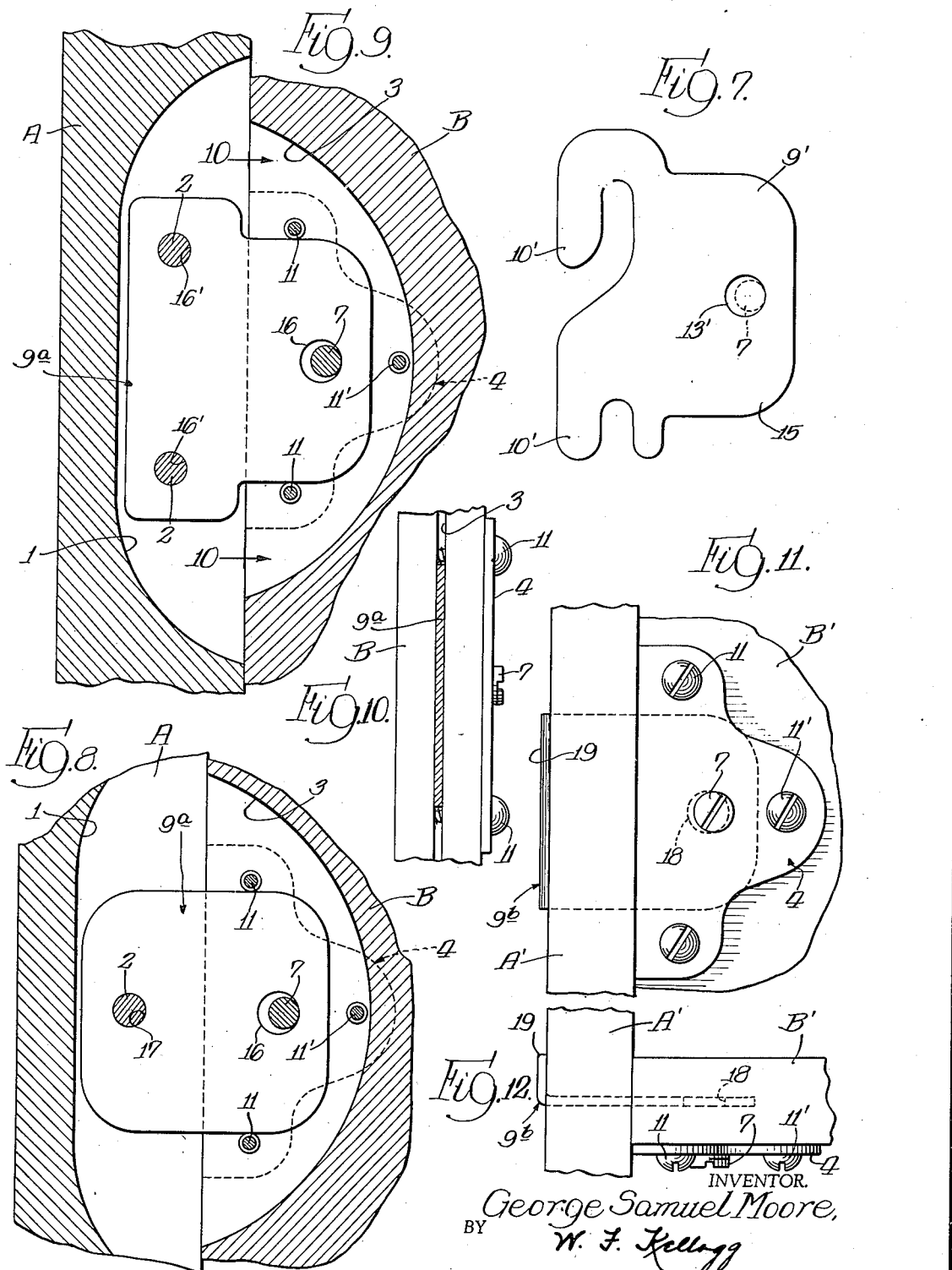

2,242,537

UNITED STATES PATENT OFFICE 2,242,537

CLAMPING COUPLING JOINT

George Samuel Moore, Chicago, Ill.

Application April 18, 1940, Serial No. 330,365

4 Claims. (Cl. 5—296)

This invention relates to improvements in clamping coupling joints and more particularly, to that type of joint used for connecting side rails of bedsteads to the head or foot sections or posts thereof, whereby such parts will be firmly and positively interconnected, an important object of the invention being to provide a joint of the indicated character which is so constructed as to permit of its installation with a minimum of effort and labor, hence, effecting a material saving in production and assembly costs.

It is also an object of the invention to provide a clamping coupling joint employing an anchoring plate which, when positioned upon a bed rail or similar element will function as a guide jig for facilitating proper placement and confinement of the joint coupling means in and to said rail whereby its operative and adjustable connection with the bedstead post or head or foot section will be assured.

In a prefatory sense, it may be stated that in wooden bed constructions, mechanical means are often provided for joining (preferably detachably joining) the adjacent ends of the side rails with the head and foot sections or posts thereof whereby the same will be firmly and rigidly fastened in assembled relationship. Such fasteners or joints, in so far as I am aware, are generally unsatisfactory and inefficient. The constructions of many thereof, are such that when they are operatively installed or connected, relative creeping movement between the interconnected parts occurs. Hence, an unstable and wobbly bedstead assembly results. Moreover, in some instances, complete failure of the joint occurs and material damage to the bedstead elements, as well as to the joints, is done. It is therefore highly desirable that a bedstead fastener or joint shall be of such construction and possessed of such efficiency that, when operatively installed, it will provide the utmost of dependability and security to the ends that the same will effect firm, rigid, stress enduring and lasting interconnection between elements equipped or provided therewith.

My improved joint, when installed or operatively connected upon a bedstead will positively function to constitute a dependable, firm, rigid and otherwise overall efficient connection between bedstead side rails and the bedstead head and foot sections or posts. Additionally, and quite important, the improved device may be attached or installed with a minimum of labor and by comparatively unskilled labor inasmuch as the body or bracket plate of the device is so constructed and equipped that when attached or operatively positioned adjacent a bed side rail, it will serve as a guide or jig means for greatly facilitating subsequent assembly of its component elements of construction. Additionally, my improved fastener or clamping coupling joint is of such novel construction that when attached or installed, it will provide not only a firm, strong and dependable interconnecting medium, but will so interconnect the bedstead parts as to cause one to brace the other and moreover, prevent breakage of the affected parts or ripping or tearing of the joint or any of its elements of construction from those parts of the bedstead receiving the same.

At this point, it may be well to note that whereas I have hereinbefore stressed the application or adaptation of my improved clamping coupling joint to bedsteads, the same may be used to material advantage in effecting various other forms or species of joints, as for example, constructional joints of any sort or character whether applied to metal, plastics, wood or combinations thereof, bracket or shelving supports, collapsible mold section joining means, etc.

Other objects of the invention will be in part obvious and in part pointed out hereinafter.

In order that the invention and its mode of operation may be understood by those skilled in the art to which it pertains, I have in the accompanying illustrative drawings and in the detailed following description based thereon set out several possible embodiments of my invention.

In these drawings:

Figure 1 is a perspective view of a fragment of a bedstead post and side rail interconnected by my improved device.

Figure 2 is an enlarged fragmentary vertical section through a bedstead post and side rail equipped with the invention.

Figure 3 is a vertical section taken on the line 3—3 of Figure 2, looking in the direction in which the arrows point.

Figure 4 is a horizontal section taken on line 4—4 of Figure 2, looking in the direction in which the arrows point.

Figure 5 is a fragmentary horizontal section through a bedstead post and a portion of its side rail showing my improved device in relatively loosened or substantially disconnected relation.

Figure 6 is a horizontal section taken on the line 6—6 of Figure 2, looking in the direction in which the arrows point.

Figure 7 is a detail in elevation of a slightly modified form of coupling element wherein the adjusting or locking screw is indicated in dotted lines.

Figure 8 is a fragmentary vertical longitudinal section through a post of a bedstead and the adjacent portion of its side rail in interconnected relationship, such connection being effected through a slightly modified form of my improved device, wherein such modification resides in the coupling element.

Figure 9 is a similar view of another modified form of coupling element.

Figure 10 is a fragmentary vertical section taken on the line 10—10 of Figure 9, looking in the direction in which the arrows point.

Figure 11 is a fragmentary side elevation of another modified form of coupling plate, wherein said plate is formed with a right angularly extended finger, and Figure 12 is a fragmentary top view of the same.

Having more particular reference to the drawings, in connection with which like characters will designate corresponding parts throughout, A represents a portion of a head post of a wooden bedstead and B a portion of one end of a wooden bedstead side rail thereof. The post A, according to the design of the bedstead, may be replaced by a head or foot section of an equipped bedstead, to which the opposite ends of the side rail B are adapted to interconnect. Moreover, it will be understood that the side rail B is provided with my improved clamping coupling joint at or on each of its opposite ends whereby to permit of interconnection between the post A or the bedstead head and foot sections, as aforesaid. The post A is provided with an inwardly facing and marginally opening slot or pocket 1 through which relatively vertically spaced pins 2 transversely pass and have their opposite end portions suitably anchored or fixed in adjacent portions of said post A; it being noted that the relatively spaced and vertically arranged pins 2 are so positioned that those portions thereof spanning the slot or pocket 1 are exposed to the inner open side of said slot and are arranged in proximity thereto, slightly inwardly of the same.

The bed rail B is provided with a slot 3 in each of its opposite ends. In the accompanying drawings, however, but one of these slots in one end of the rail B has been illustrated.

Arranged upon one side of the rail B adjacent its slot provided end is a metal plate 4 having openings formed in its normally upper and lower ends and another opening formed in its normally inwardly disposed side, the purpose of which will be presently apparent. Said normally inwardly disposed side of the plate 4 is preferably provided with an intermediately arranged integral extension 5 through which the last mentioned opening is formed and thus, it will be seen that this latter opening is disposed intermediately of the upper and lower extremities of the plate 4. Another and larger opening is formed in the intermediate portion of the plate 4, inwardly spaced from but aligning with the intermediate opening in the integral extension 5, said opening being bordered by an annular flange or lip 6 extended from adjacent portions of the inner side or face of the plate 4. This larger opening is internally screw threaded as is the inner surface of the annular flange or lip 6 and is adapted to have an adjusting screw 7 turned into engagement therewith from the outer side or face of the plate 4. The inner extremity of the adjusting screw 7 is tapered or otherwise similarly formed, as at 8.

Received within the slot 3 formed in the referred to side rail is a coupling or fastener element 9, consisting of a substantially flat piece of metal or other suitable material having relatively spaced and downwardly disposed fingers 10 provided on one side (preferably the normally outer side) thereof, the disposition or arrangement of said fingers being such that pockets are provided by the same in conjunction with adjacent portions of the element 9 for receiving the relatively vertically spaced pins 2—particularly those portions of said pins spanning the slot or pocket 1 in the post A. Moreover, the relative spacing between the pockets constituted by the fingers 10 is such that when said fingers are engaged over the pins 2, and moved downwardly, these pins 2 will be each brought into abutting engagement with the inner ends of said pockets. Screws 11 are passed through the openings formed in the normally upper and lower ends of the plate 4 into fixed engagement with adjacent portions of the side rail B, thus securing the former to the latter. In connecting the plate 4 to one side and end portion of the side rail B, the plate 4 is arranged upon one side of the rail B directly adjacent its end so that the normally outer side or marginal portion of the plate lies substantially flush with respect to said end of the side rail. Thus, when the screws 11 are passed through the openings in the normally upper and lower ends of the plate 4 and into fastening engagement with adjacent portions of the rail B, the intermediate parts of said screws will be passed transversely through the slot 3 in vertically opposed and spaced relationship. However, prior to engagement or passing of the screws 11 through the pocket 3, the coupling element 9 is arranged within said pocket so that an intermediate part of its inner marginal portion is brought into abutting engagement with an adjacent portion of the screw 11' engaged through the opening in the extension 5 of the plate 4 and transversely in the adjacent portion of the side rail B. Thus, it will therefore be understood that the extent of inward movement of the element 9 in the slot 3 will be limited through the medium of said screw 11'. The coupling element 9 is provided with slots or ways 12 in its normally upper and lower end portions and in proximity to its normally inner side. The relative arrangement of these slots is such that they will correspond to the spacing of the openings in the normally upper and lower ends of the plate 4 receiving the aforesaid fastening screws 11. In consequence, as the screws 11 are engaged through the rail B and through the slot 3 therein, they will pass through the slots 12 of said coupling element 9, effecting movable connection of the latter in the slot 3 and to the side rail B. The mounting or arrangement of the coupling element 9, as just described, is effected so that the normally outer side portion of said coupling element and its downwardly disposed fingers 10 will be extended from or beyond the adjacent end of the side rail B. In this way, it will be readily understood that the extended outer portion of the coupling element 9 and the fingers 10 may be engaged or connected with the pins 2 anchored in the post A, as hereinbefore described.

In order that clamping motion may be imparted to the coupling element 9 from the hereinbefore described adjusting screw 7, I form an opening 13 in an intermediate part of that portion of said element 9 received within the slot 3 in the side rail B. Said opening, with arrangement of the coupling element 9 in the slot 3, is arranged in juxtaposed relationship to an opening or way 14 formed in an adjacent portion of the outer side of the rail B and as illustrated in the Figure 5, which opening aligns with the adjusting screw receiving opening in the plate 4, hereinbefore described, and also, receives the annular internally screw threaded flange or lip 6 therein. Thus, by turning the adjusting screw 7 inwardly with respect to the screw threaded opening in the plate 4, it will be seen that the tapered inner end 8 thereof will engage in the opening 13 of the coupling element 9 and will have a bearing upon the rearward side wall of said opening. As inward turning of the adjusting screw 7 is continued, the progressive engagement of the tapered end 8 thereof with said side wall of the opening 13, obviously, this will impart lateral inwardly directed motion to said coupling plate 9, hence, causing the fingers 10 on the outer side of this element to be brought into binding or clamping engagement with the engaged intermediate portions of the post anchored pins 2. Dependent upon the extent of inward turning of the adjusting screw 7 through the plate 4, this clamped coupling connection between the coupling element 9 and its fingers 10 and the post anchored pins 2 will be regulated. In consequence, the abutting adjacent portions of the post A and the side rail B will be drawn into firm, rigid and stress enduring interengagement.

To disconnect the side rail B from the post A, it is only necessary that the adjusting screw be rotated in a counter direction, thereby disengaging its tapered end 8 from the opening 13 of the coupling element 9 to such an extent as to loosen the fingers 10 with respect to the post anchored pins 2. When the coupling element 9 has been sufficiently loosened, the side rail B may be moved upwardly or vertically so as to bring the fingers 10 out of retaining engagement with the several post anchored pins 2. Displacement of the coupling element 9 with respect to the slot equipped end of the rail B, of course, will be prevented by reason of the slotted mounting of said coupling element upon intermediate portions of the hereinbefore described plate fastening screws 11.

In the Figure 7, I have shown a slightly modified form of coupling element, indicated by the numeral 9', consisting of a substantially flat piece of metal or other suitable material provided, on one of its sides, with a pair of relatively spaced downwardly disposed fingers 10', corresponding to the fingers 10 of the preceding embodiment of the invention and serving the same utility. The opposite or normally inner portion of said element is reduced to provide an inwardly disposed tongue 15 having an opening 13' formed in an intermediate portion of the same. In usage of this particular modified form of coupling element, its tongue 15 is slidably engaged in the slot or pocket 3 of the rail B, snugly between the relatively opposed screws 11 to a position within said slot or pocket 3 where the inner marginal portion of the tongue is brought into abutting engagement with an adjacent portion of the screw 11'. When so positioned, that portion of the coupling plate carrying the fingers 10' will be extended for a distance beyond the rail B and in consequence, the downwardly disposed fingers may be engaged over the vertically spaced pins 2 transversely engaged with the post A through its slot or pocket 1. To effect clamping connection between the pins 2 and the fingers 10' of the coupling element 9', the adjusting screw 7 is inwardly turned with relation to the plate 4 so that its tapered inner end 8 engages the normally inner side or marginal portion of the opening 13'. Continued inward rotation or turning of the adjusting screw 7, obviously, imparts lateral inwardly directed motion to the coupling element 9', causing its fingers 10' on the outer side thereof to be brought into binding or clamping engagement with the previously engaged intermediate portions of the post carried pins 2.

In the Figure 8, I have shown a still further modified form of coupling element or plate, identifying the same, in its entirety, by the reference character 9a. This particular modified form of coupling element consists of a substantially flat plate or link having relatively opposed and spaced openings 16 and 17 formed therein; the opening 16 being in proximity to one end of the element and the opening 17 in proximity to its opposite end. The width of the coupling element 9a substantially corresponds to the distance or spacing between the securing screws 11 of the plate 4 and is adapted to be snugly and slidably received therebetween within the pocket 3 of the rail B or its equivalent. The opening 16 is adapted to have the tapered inner end 8 of the adjusting screw 7 engaged therein, in the manner hereinbefore described. The opposite or extended end of the coupling element 9a, i. e., that end extending outwardly from or beyond the pocket 3 of the rail B or its equivalent, is adapted to be engaged in the pocket 1 of the post A or its equivalent. A securing pin is passed through an appropriate portion of the post A or its equivalent, transversely through the pocket 1 and through the opening 17 in said extended end of the coupling element 9a. Hence, loose connection between the elements A and B is effected. To effect tight, rigid or clamping engagement between such elements, it is only necessary that the adjusting screw 7 be turned inwardly so that its tapered inner end 8 will move through the opening 16 in bearing engagement with the inner side of said opening, such motion, of course, serving to transmit lateral inwardly directed motion to the coupling element or plate 9a whereby to draw its opposite end receiving the securing pin in the post A through its opening 17 into binding or clamping engagement with said securing pin. Of course, instead of the coupling element 9a being provided with but one opening 17, its normally outwardly extended end portion may, if desired, be provided with two or more of such pin receiving openings designated by the numeral 16' and moreover, if desired, said normally outwardly extended end of a coupling plate 9a, so formed, may be enlarged to permit of the formation of these relatively spaced openings 16' therein.

Again, in the Figure 11, I have shown a further modified form of my improved joint coupling element, designating the same in its entirety, by the reference character 9b. In this particular form of the invention, the coupling element is constructed of a substantially flat, suitably shaped and sized piece of metal or other material, having an opening 18 formed in one end portion thereof intermediately of its opposite sides. The opposite end portion of the coupling element is provided with substantially right angularly disposed finger or flange 19. In usage of this type or modified form of fastener, the coupling element 9b is engaged through a member A' so that the right angularly disposed finger or flange 19 is brought into embracing engagement with a portion of the adjacent side thereof. The opposite or extended portion of the coupling element 9b, i. e., that portion provided with the opening 18, is engaged in a slot or pocket formed in an adjacent end or portion of the member B', which member is provided with a plate 4 secured to one side of said member B' by means of the screws 11 and 11' and provided with an adjusting screw 7. Thus, when said outwardly extended end of the coupling element 9b is slidably engaged in said pocket formed in the member B', snugly between the relatively spaced screws 11, the opening 18 formed therein will be aligned with the tapering end 8 of the adjusting screw 7. By turning the adjusting screw 7 inwardly through the plate 4, inward lateral movement will be transmitted to the coupling element 9b, thereby clampingly and bindingly interconnecting the members A' and B' and effecting a firm, rigid and durable joint.

As hereinbefore stated, my improved clamping coupling joint or fastener is not intended to be limited in its usage to the fastening or interconnecting of bed side rails with bed posts or head or foot sections. To the contrary, the device may be used to effect firm and rigid jointures or couplings between various elements or sectional constructions, as for example, sectional walls, knock-down walls which are adapted to be removably connected or secured to joists or other form of anchoring means, and various other forms of joints, too numerous to specify. The improvement or invention resides, primarily, in the provision of a clamping coupling joint or fastener consisting of a combined jig or guide and supporting plate 4 serving to facilitate substantially automatic alignment or proper assembly of the coupling element 9, 9', 9a or 9b with relation thereto, and the adjusting screw 7 engaging with an adjacent end of said coupling element to effect the hereinbefore described binding or clamping connection. At this point, it will be understood and appreciated by workers skilled in the art, that the operative assembly of my improved joint is clearly facilitated or expedited by the provision of the jig or guide plate 4, hereinbefore described, with its fastening screws 11 and 11'. These fastening screws 11 and 11' serve, not only as fastening devices per se, but also, as means for guiding movement of the particular coupling element provided thereto into proper relationship to the element or member carrying said plate 4 so that the screws may be engaged either through the slots 12 of said coupling element or slidably receive the opposite sides of said coupling element snugly therebetween.

Manifestly, the constructions shown are capable of further modification, and such modification as is within the scope of my claims, I consider within the spirit of my invention.

I claim:

1. In combination with elements to be interconnected, adjacent portions of which are provided with ways, anchoring means in one of said elements transversely passing through its way in spaced relationship, a plate carried on one side of an adjacent portion of the remaining element, a coupling element received in said last mentioned way having its normally outer portion extended therebeyond engageable with said anchoring means, means engaged through said plate and with adjacent portions of its element for connecting the former to the latter, said means passing transversely through the way of said last mentioned element and slidably supporting said coupling element therein, and means carried by said plate engaging therethrough and disposed at substantially right angles to said coupling element operable to transmit lateral motion to said coupling element.

2. A bedstead fastener comprising a plate engageable with one side of the bedstead side rail adjacent one end thereof, said end of said side rail having a slot formed therein, a coupling element consisting of a substantially flat plate partially engaged in said slot in the side rail, that portion of said coupling element engaged in said side rail slot having relatively spaced slots therein, connecting screws engaged through portions of said plate, adjacent portions of said side rail and through the slots in said coupling element, the normally inner end portion of said coupling element having an opening formed therein, an adjusting screw threadedly engaged through said plate and its inner end tapered and engaged in said opening formed in the normally inner end portion of said coupling element, engaging means on the normally outer and extended end of said coupling element, a post of the bedstead having a way formed therein, pins engaged transversely through said post and its way in spaced relationship and adapted to be engaged by said engaging means on the normally outer and extended end of said coupling element upon its introduction into the way in said post.

3. In a fastener, a plate having an opening in an intermediate portion thereof, a flat coupling element arranged in relatively spaced parallelism to the plate having an opening in an intermediate portion thereof substantially opposite the opening in said plate and elongated openings in its opposite end portions, anchoring means passing through portions of the plate and through the elongated openings of the coupling element slidably supporting the latter, and means inwardly engaged through the opening in said plate and entering the opening in said coupling element for transmitting lateral motion to the latter.

4. In a fastener, a plate having an opening in an intermediate portion thereof, a flat coupling element arranged in relatively spaced parallelism to the plate having an opening in an intermediate portion thereof approximately opposite the opening in said plate and longitudinally disposed elongated openings in its opposite extremities, anchoring means passing inwardly through portions of the plate and through the elongated openings of the coupling element slidably supporting the latter, and a screw engaged through the opening in said plate having its inner extremity tapered and engaged in the opening in the intermediate portion of said coupling element having bearing, at times, upon opposite sides thereof and the remaining end of said screw being exposed adjacent the normally outer side of said plate.

GEORGE SAMUEL MOORE.